(12) United States Patent
Guo et al.

(10) Patent No.: US 10,791,038 B2
(45) Date of Patent: Sep. 29, 2020

(54) ONLINE CLOUD-BASED SERVICE PROCESSING SYSTEM, ONLINE EVALUATION METHOD AND COMPUTER PROGRAM PRODUCT THEREOF

(71) Applicant: Industrial Technology Research Institute, Hsinchu (TW)

(72) Inventors: Chien-Yang Guo, Taichung (TW); Chih-Hsuan Lu, Taoyuan (TW); Chih-Pin Su, Taoyuan (TW); Chin-Sheng Yeh, Taoyuan (TW); Hao-Yuan Chen, Hsinchu County (TW); Shin-Yi Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 15/458,988

(22) Filed: Mar. 15, 2017

(65) Prior Publication Data
US 2018/0176099 A1 Jun. 21, 2018

(30) Foreign Application Priority Data
Dec. 21, 2016 (TW) .............................. 105142421 A

(51) Int. Cl.
*H04L 12/24* (2006.01)
*H04L 29/08* (2006.01)

(52) U.S. Cl.
CPC ...... *H04L 41/5038* (2013.01); *H04L 41/5096* (2013.01); *H04L 67/10* (2013.01); *H04L 41/5032* (2013.01); *H04L 41/5041* (2013.01)

(58) Field of Classification Search
CPC . H04L 41/5096; H04L 43/08; H04L 63/1416; G06F 15/16; G06F 15/177; G06F 9/44505

(Continued)

(56) References Cited

U.S. PATENT DOCUMENTS 5,714,866 A * 2/1998 S .......................... H02J 7/00712
320/152
5,767,460 A * 6/1998 Thangavelu .......... B66B 1/2458
187/382

(Continued)

FOREIGN PATENT DOCUMENTS

CN 102591778 7/2012
CN 102880542 1/2013

(Continued)

OTHER PUBLICATIONS

Kaggle, "Kaggle makes it easy to connect your data with data scientists," Retrieved: Feb. 23, 2017, Available at: https://www.kaggle.com/host.

(Continued)

*Primary Examiner* — Tesfay Yohannes
(74) *Attorney, Agent, or Firm* — JCIPRNET

(57) ABSTRACT

An online cloud-based service processing system, an online evaluation method and a computer program product thereof are provided. The online evaluation method includes: running at least one application service unit of the processing system; executing at least one evaluation registration procedure for at least one application service evaluation unit of the processing system in response to at least one registration request; running the at least one application service evaluation unit; dispatching at least one online service request respectively to the at least one application service unit and the at least one application service evaluation unit, and generating at least one output result corresponding to the at least one online service request; and calculating at least one ranking for each of the at least one application service evaluation unit based on output result(s) generated by the at least one application service evaluation unit among the at least one output result.

28 Claims, 6 Drawing Sheets

(58) Field of Classification Search
USPC .......................................... 709/224; 370/152
See application file for complete search history.

(56) References Cited

U.S. PATENT DOCUMENTS

| | | | |
|---|---|---|---|
| 7,069,234 B1 | 6/2006 | Cornelius et al. | |
| 7,627,543 B2* | 12/2009 | Lock ..................... | G06N 5/025 |
| | | | 706/47 |
| 7,908,183 B2 | 3/2011 | Jacobi et al. | |
| 8,027,981 B2* | 9/2011 | Episale ................. | G06Q 10/10 |
| | | | 707/740 |
| 8,090,621 B1 | 1/2012 | Chakrabarti et al. | |
| 8,738,459 B2 | 5/2014 | Virdhagriswaran | |
| 8,875,131 B2 | 10/2014 | Shae et al. | |
| 9,135,320 B2 | 9/2015 | Goyal et al. | |
| 9,218,746 B2 | 12/2015 | Lydon et al. | |
| 9,225,621 B2* | 12/2015 | Tseitlin ............... | H04L 41/5025 |
| 9,444,838 B2* | 9/2016 | McGloin ................ | G06F 9/505 |
| 9,823,737 B2* | 11/2017 | Mazed ............... | G06K 9/00268 |
| 10,007,701 B2* | 6/2018 | Subramanian .......... | G06F 16/00 |
| 10,091,129 B2* | 10/2018 | Fukasawa ............ | H04L 67/325 |
| 2011/0208606 A1 | 8/2011 | Hadar et al. | |
| 2011/0282758 A1 | 11/2011 | Jacobi et al. | |
| 2011/0307304 A1 | 12/2011 | Mercuri | |
| 2013/0073488 A1* | 3/2013 | Anderson ............. | G06Q 10/04 |
| | | | 706/12 |
| 2015/0339628 A1 | 11/2015 | Oh et al. | |
| 2016/0301746 A1* | 10/2016 | Bauer ..................... | H04L 67/10 |

FOREIGN PATENT DOCUMENTS

| | | |
|---|---|---|
| CN | 104331477 | 2/2015 |
| CN | 105718805 | 6/2016 |

OTHER PUBLICATIONS

Kaggle, "Your Home for Data Science," Retrieved: Feb. 23, 2017, Available at: https://www.kaggle.com.

"Office Action of Taiwan Counterpart Application," dated Apr. 14, 2017, p. 1-p. 8, in which the listed references were cited.

* cited by examiner

ONLINE CLOUD-BASED SERVICE PROCESSING SYSTEM, ONLINE EVALUATION METHOD AND COMPUTER PROGRAM PRODUCT THEREOF

CROSS-REFERENCE TO RELATED APPLICATION

This application claims the priority benefit of Taiwan application no. 105142421, filed on Dec. 21, 2016. The entirety of the above-mentioned patent application is hereby incorporated by reference herein and made a part of this specification.

TECHNICAL FIELD

The disclosure relates to an online cloud-based service processing system, an online evaluation method and a computer program product thereof.

BACKGROUND

With the blooming development of computer technology and Internet, application services provided through cloud computing also become increasingly popular. Currently, a common cloud-based service includes a product recommendation service, a searching service, a personalized e-paper sending list recommendation service, a sales prediction service, etc. In general, a service developer may run a service engine in a cloud server to execute its developed application in order to provide various cloud-based services for a service tenant to rent. The service tenant may connect its operating website with the cloud-based services provided by the cloud server, so the cloud server may provide corresponding service contents according to online service requests from the websites. For instance, the service tenant may rent the product recommendation service from a cloud-based service provider and connect its operating online shopping website with the product recommendation service so a product recommendation list may be promptly provided when products are being browsed by consumers.

During development of application for cloud-based service, the service developer often needs to examine performance of the application using a field verification. For the cloud-based services, a method of examining the performance includes an offline test and an online test. The offline test examines the performance using history data, whereas the online test directly examines the performance while the service is being provided. However, because the offline test is unable to instantly acquire response from users regarding the service, it is possible that one specific algorithm for providing the service may provide a favorable performance during the offline test but may not provide the same performance during the online test. Accordingly, finding a way to examine the performance of the cloud-based service by providing an online field is one of the subject matters concerned by person skilled in the art.

SUMMARY

An exemplary embodiment of the disclosure provides an online cloud-based service processing system, which includes at least one server. The at least one server includes at least one memory and at least one processor. The at least one server is configured to execute a plurality of codes stored in the at least one memory. The online cloud-based service processing system further includes the at least one application service unit, the at least one application service evaluation unit, the evaluation management module, the dispatching module and the evaluation module. The at least one application service unit is configured to run at least one application service, and the at least one application service evaluation unit is configured to evaluate one or more application services. The evaluation management module is configured to execute at least one evaluation registration procedure of the at least one application service evaluation unit in response to at least one registration request received for the at least one application service evaluation unit. The dispatching module is configured to dispatch a first part of at least one online service request to the at least one application service unit and dispatch a second part of the at least one online service request to the at least one application service evaluation unit, so as to generate at least one output result corresponding to the at least one online service request. The evaluation module is configured to calculate at least one ranking for each of the at least one application service evaluation unit based on output result(s) generated by the at least one application service evaluation unit among the at least one output result.

Another exemplary embodiment of the disclosure provides an online evaluation method adapted for an online cloud-based service processing system. The method includes: running at least one application service unit of the online cloud-based service processing system; executing at least one evaluation registration procedure of at least one application service evaluation unit of the online cloud-based service processing system in response to at least one registration request received for the at least one application service evaluation unit; running the at least one application service evaluation unit; dispatching a first part of at least one online service request to the at least one application service unit, dispatching a second part of the at least one online service request to the at least one application service evaluation unit, and generating at least one output result corresponding to the at least one online service request; and calculating at least one ranking for each of the at least one application service evaluation unit based on output result(s) generated by the at least one application service evaluation unit among the at least one output result. Wherein the online cloud-based service processing system includes at least one memory and at least one processor, and the at least one processor is configured to execute a plurality of codes stored in the at least one memory to perform the online evaluation method.

Another exemplary embodiment of the disclosure provides a computer program product including a non-transitory computer readable storage medium having a computer readable program stored therein, wherein the computer readable program, when executed on an online cloud-based service processing system including at least one processor is capable of accomplishing the online evaluation method described above.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
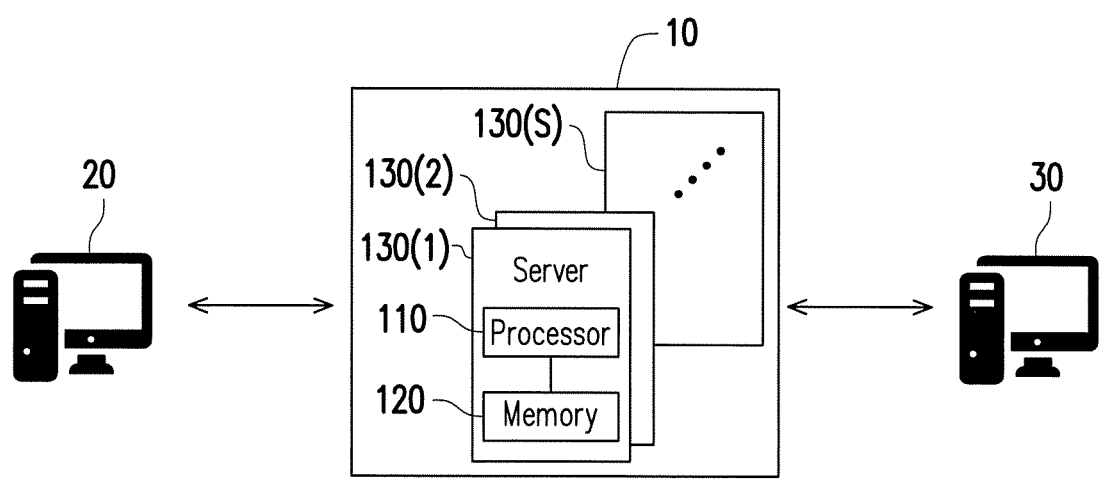
FIG. 1 is a schematic diagram illustrating a cloud-based service server included by an online cloud-based service processing system according to an exemplary embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram illustrating a cloud-based service server included by an online cloud-based service processing system according to an exemplary embodiment.

With reference to FIG. 1, an online cloud-based service processing system 10 operated on a cloud-based service platform (not illustrated) may be configured to include at least one server 130(0) to 130(S), where S is a positive integer. Each server may include at least one processor and at least one memory. For example, the server 130(1) may include at least one processor 110 and at least one memory 120. However, although the servers 130(1) to 130(S) are illustrated in the embodiment of FIG. 1, the number of the servers are not particularly limited by the disclosure. According to different requirements in practical application, the online cloud-based service processing system 10 may be configured to run one or more servers.

The at least one processor 110 may be configured to process operation of the server 130(1). The at least one processor 110 may be, for example, a central processing unit (CPU) or other programmable microprocessors, a digital signal processor (DSP), a programmable controller, an application specific integrated circuit (ASIC), a programmable logic device (PLD), a multi-core processor, other similar devices or a combination of above-mentioned devices, which are not particularly limited by the disclosure.

The at least one memory 120 is configured to store information, data, applications, codes, etc., and allows the processor 110 to perform various functions of the server 130(1). For instance, the at least one memory 120 may be configured to store program codes configured to be executed by the at least one processor 110 and/or data configured to be processed by the at least one processor 110. For example, the at least one memory 120 may be configured to store program codes to be loaded for executing a cloud-based service, item information and online service requests received from the online environment, output result(s) generated after executing the cloud-based service, etc. Herein, the at least one memory 120 may be a volatile memory, a non-volatile memory or a combination thereof. For example, the at least one memory 120 may include a hard disk, a random access memory, a flash memory, a compact disk read only memory (CD-ROM), a solid state memory, a digital versatile disk read only memory (DVD-ROM), a compact disk, a circuit or an IC configured to store information, etc.

The at least one server 130(1) to 130(S) included by the online cloud-based service processing system 10 may be configured to provide various cloud-based service functions. In an embodiment, the at least one processor 110 of the at least one server 130(1) to 130(S) may be configured to load program codes for each executing module (and/or units) disposed in the at least one memory 120 in order to provide the cloud-based service. The cloud-based service as mentioned in the disclosure may include a product smart recommendation service, a smart searching service, a personalized e-paper sending list recommendation service, a sales prediction service, etc., but the disclosure is not limited to the above.

In the present exemplary embodiment, industry clients or server tenants (hereinafter, collectively known as a service tenant 20) and a service developer 30 each may respectively operate electronic devices (e.g., PCs, servers) to be connected to the online cloud-based service processing system 10 via the Internet. The service developer 30 may provide its developed application to the online cloud-based service processing system 10. Through the at least one server 130(1) to 130(S) run by the online cloud-based service processing system 10, the application of the service developer 30 may be connected to the online environment of the service tenant 20, and a corresponding cloud-based service may be provided based on an online service request took place in the online environment of the service tenant 20 (e.g., a shopping website operated by the service tenant 20). For instance, a click operation executed by an end user when browsing products on the shopping website operated by the service tenant 20 may trigger the online service request that requesting for recommended products. The online cloud-based service processing system 10 may provide a corresponding content for the recommended products according to the online service request.

It could be understood that, although only one service developer 30 is illustrated in FIG. 1, the application of the cloud-based service may also be provided by more than one service developer 30 in an embodiment. Furthermore, the service developer 30 may be a crowd interested or studied in the application of the cloud-based service, such as a data scientist, a program designer, etc., which are not particularly limited by the disclosure. In brief, the online cloud-based service processing system 10 may run applications provided by multiple service developers 30 to provide the service content according to the online service requests and assign parts of the service requests to conduct performance testing for a service algorithm in each application that providing the service. By doing so, it is expected to continuously improve cloud-based service quality and/or matchmaking between the service tenant and the service developer.

Figure 2:
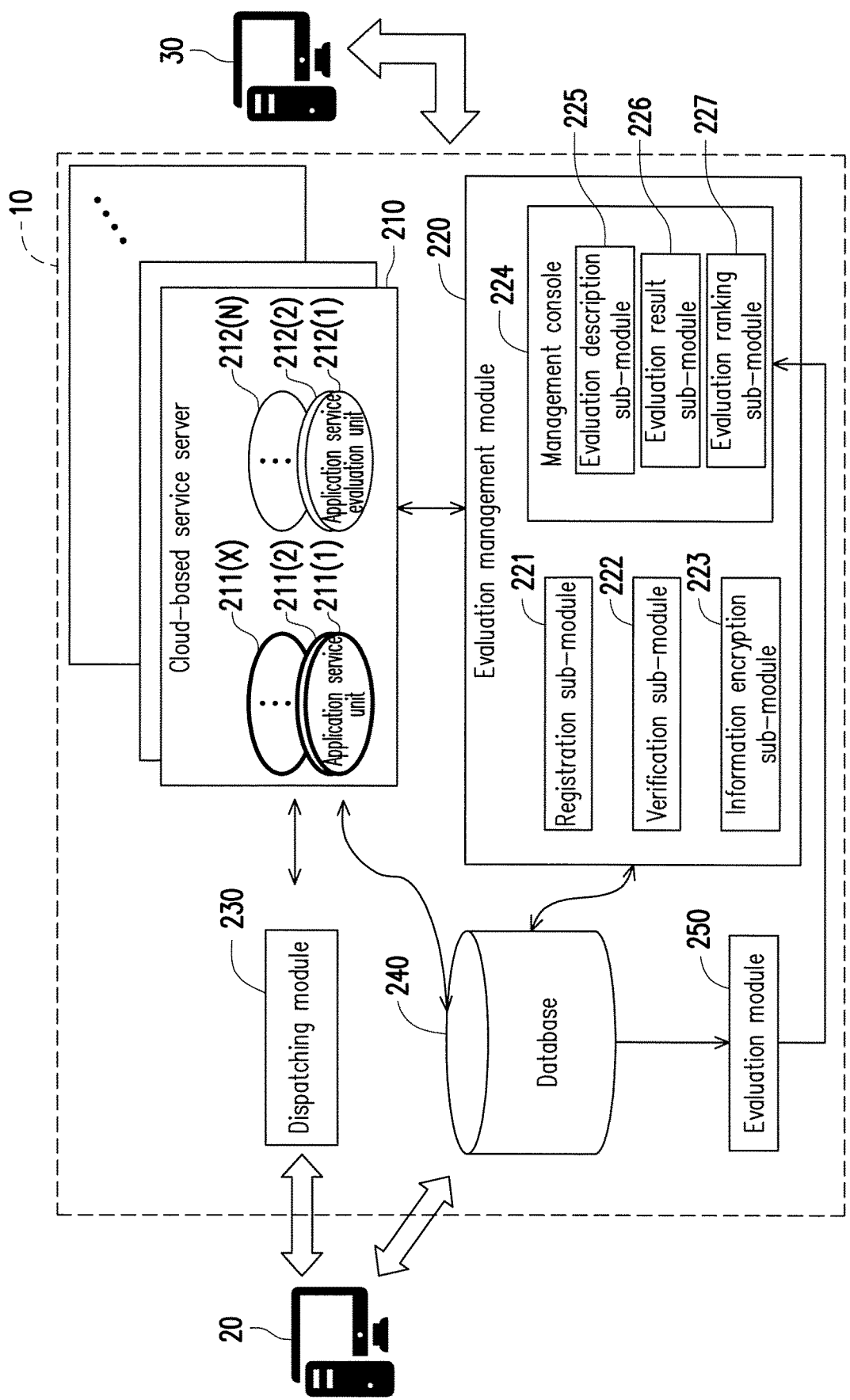
FIG. 2 is a schematic diagram illustrating an online cloud-based service processing system according to an exemplary embodiment.

FIG. 2 is a schematic diagram illustrating an online cloud-based service processing system according to an exemplary embodiment.

With reference to FIG. 2, the online cloud-based service processing system 10 includes at least one cloud-based service server 210, an evaluation management module 220, a dispatching module 230, a database 240 and an evaluation module 250. The at least one processor 110 may be configured to run each module of the online cloud-based service processing system 10 to activate the respective function of the online cloud-based service processing system 10. In the present exemplary embodiment, the online cloud-based service processing system 10 may include one or more cloud-based service servers 210. In an embodiment, each module may be configured to run in the same server, such as the cloud-based service server 210. In another embodiment, the modules may be flexibly configured to run independently or run together in at least one server, and the modules may be disposed in the same server or different servers. The architecture of the cloud-based service server 210 in the present exemplary embodiment may be identical or similar to that of the server 130(1) in FIG. 1.

In this embodiment, the cloud-based service server 210 may be configured to run at least one application service unit 211(1) to 211(X) and at least one application service evaluation unit 212(1) to 212(N), where X and N are positive integers. In different embodiments, when the online service request is sent from the service tenant 20, the cloud-based service server 210 may be configured to run the at least one application service unit 211(1) to 211(X) or the at least one application service evaluation unit 212(1) to 212(N), or run the at least one application service unit 211(1) to 211(X) and the at least one application service evaluation unit 212(1) to 212(N) together, so as to execute the cloud-based service function in order to generate at least one output result corresponding to the online service request. The at least one processor 110 may be configured to run each unit or each module of the cloud-based service server 210 to activate each corresponding function of each unit or each module of the cloud-based service server 210. Furthermore, the at least one application service unit 211 may be configured to run at least one application service, and the at least one application service evaluation unit 212 may be configured to evaluate one or more application services. The one or more application services evaluated by the application service evaluation unit may be identical to or different from the at least one application service run by the application service unit.

The cloud-based service server 210 illustrated in the embodiment of FIG. 2 may be configured to run the application service units 211(1) to 211(X) and the application service evaluation units 212(1) to 212(N), but the numbers of the application service unit 211(1) to 211(X) and the application service evaluation unit 212(1) to 212(N) are not particularly limited by the disclosure. According to different requirements in an application, the cloud-based service server 210 may be configured to run one or many of the application service unit 211(1) to 211(X) and the application service evaluation unit 212(1) to 212(N). Further, in different embodiments, the at least one application service unit 211(1) to 211(X) and the at least one application service evaluation unit 212(1) to 212(N) may be configured to run independently or run together in one or more servers, and said units may be disposed to the same server or different servers.

The evaluation management module 220 includes a registration sub-module 221, a verification sub-module 222, an information encryption sub-module 223 and a management console 224.

The registration sub-module 221 may be configured to execute an evaluation registration procedure of the at least one application service evaluation unit 212(1) to 212(N). When the service developer 30 intends to have its developed application of the cloud-based service participating in the online test, the service developer 30 may provide at least one registration request to the online cloud-based service processing system 10. In response to the at least one registration request, the at least one processor 110 may be configured to register the at least one application service evaluation unit 212(1) to 212(N) according to the at least one registration request. In detail, the at least one processor 110 may be configured to run the registration sub-module 221 so as to set at least one service logic rule and at least one service data model corresponding to the at least one application service evaluation unit 212(1) to 212(N) according to the at least one registration request. The at least one application service evaluation unit 212(1) to 212(N) may be configured to execute the cloud-based service function according to the at least one service logic rule and the at least one service data model. For example, the at least one service logic rule defines a combination approach for the designated at least one service data model etc. Further, the at least one processor 110 may store the set at least one service logic rule and the at least one service data model to the database 240 of the at least one memory 120. The database 240 may be a Relational Database Management System (RDBMS) or an Object-oriented Database Management System (ODBMS) and may be implemented by Structured Query Language (SQL) or NoSQL, etc. Herein, the at least one processor 110 may be configured to run one or more application service evaluation units, and the number of the application service evaluation units is not particularly limited by the disclosure.

In the present exemplary embodiment, the at least one registration request provided to the online cloud-based service processing system 10 by the service developer 30 may include information related to the service logic rule and the service data model. For example, for the service data model, the at least one registration request may include at least one service data model result file matching a fixed format, which may be read and used by the service tenant 20 through a uniform application programming interface (API). This fixed format may be a default format of the online cloud-based service processing system 10. Furthermore, the at least one registration request may also include at least one training program code for creating the service data model result file(s). The at least one application service evaluation unit 212(1) to 212(N) may execute the training program code to create the service data model result file(s) in the online environment to be read and used by the application programming interface interfaced by the service tenant 20. In the case of the shopping website, the service data model result file may include a correlation record between products. For the service logic rule, the at least one registration may include a uniform resource locator (URL) of the application programming interface with input and output values in the default format of the online cloud-based service processing system 10. The at least one processer 110 may be configured to run the at least one application service evaluation unit 212(1) to 212(N) so as to connect the URL and call the application programming interface for executing the cloud-based service function. Furthermore, the at least one registration request may also include a source code for the service logic rule with input and output values in the default format of the online cloud-based service processing system 10. The at least one processor 110 may be configured to run the at least one application service evaluation unit to execute the source code for executing the application service function. In addition, the at least one registration request may also include at least one combination program code capable of combining the service logic rule used by the application service units 211(1) to 211(X) together with the service data model used by the application service units 211(1) to 211(X) to generate the new service logic rule for the registered at least one application service evaluation unit 212(1) to 212(N).

The verification sub-module 222 may be configured to execute a verification operation for evaluating whether the registered at least one application service evaluation unit 212(1) to 212(N) meets an online condition. In detail, the at least one processor 110 may be configured to run the verification sub-module 222 to verify the at least one service logic rule and the at least one service data model of the at least one application service evaluation unit 212(1) to 212(N). The online condition may be, for example, function, effectiveness or performance to be accomplished by operating the at least one application service evaluation unit 212(1) to 212(N). Further, the at least one processor 110 may be configured to connect the at least one application service evaluation unit 212(1) to 212(N) that meets the online condition to the online environment of the service tenant 20.

The information encryption sub-module 223 may be configured to execute a data protection operation for protecting the item information provided by the service tenant 20. In detail, the at least one processor 110 may be configured to run the information encryption sub-module 223 for executing a data encryption function. Taking the service tenant 20 operating the shopping website as an example, the item information may include a product name, a product price, a product description, a website revenue, a product sales, a pricing strategy, consumer information or any combination of the above items. The item information as mentioned above is merely an example, the item information may further include other information in an implementation, and the item information of the disclosure is not limited to the above.

Figure 3:
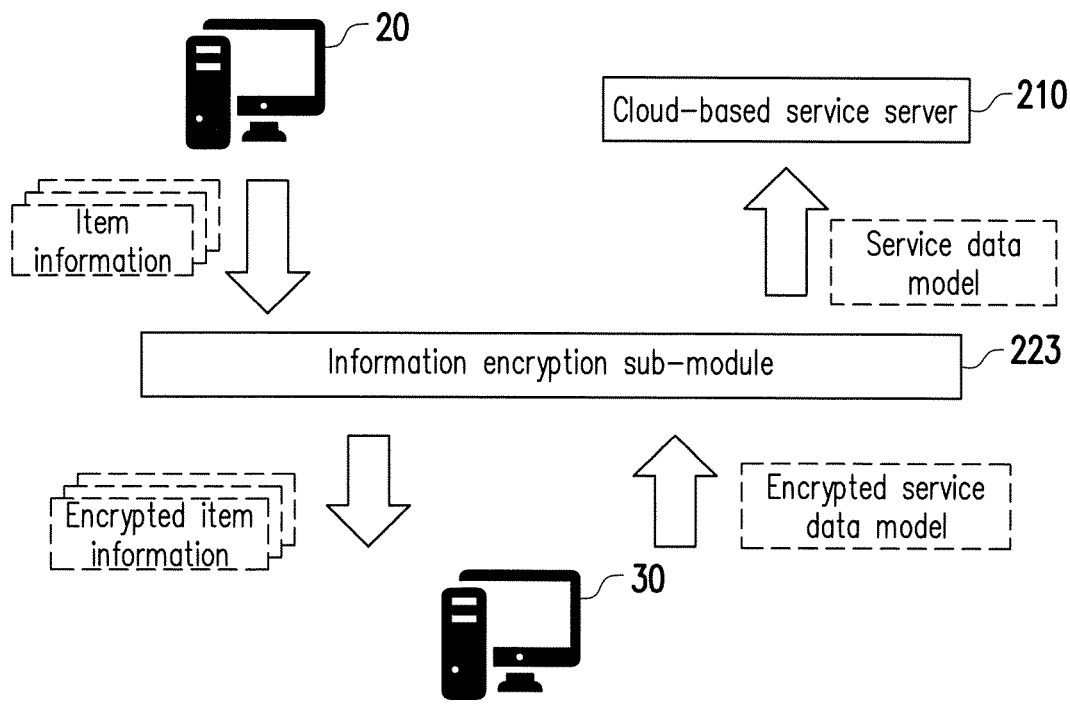
FIG. 3 is a schematic diagram illustrating an information encryption operation according to an exemplary embodiment.

FIG. 3 is a schematic diagram illustrating an information encryption operation according to an exemplary embodiment.

Referring to FIG. 2 and FIG. 3 together, the at least one processor 110 may be configured to run the information encryption sub-module 223 for executing the data encryption operation for the item information provided by the service tenant 20 and generating encrypted item information. Then, the at least one processor 110 may provide the encrypted item information to the service developer 30. After receiving the encrypted item information, the service developer 30 may execute a data analysis according to the encrypted item information so as to create an encrypted service data model. In addition, the at least one processor 110 may be configured to run the information encryption sub-module 223 to execute a restore operation on the created encrypted service data model, so as to obtain the service data model that includes the real information. Accordingly, the at least one processor 110 may be configured to run the at least one application service unit 211(1) to 211(X) and the at least one application service evaluation unit 212(1) to 212(N) so as to execute the cloud-based service according to the service data model.

The information encryption operation executed by the information encryption sub-module 223 is, for example, used to exclude confidential information from the item information. In detail, the information encryption sub-module 223 may be configured to determine the confidential information to be excluded according to a creating approach of the service data model. For example, for the service data model created based on the data analysis of a user-behavior mode (e.g., a click behavior), the information encryption sub-module 223 may be configured to exclude a specific description regarding products from the item information. In addition, for the service data model created is based on the data analysis of the essence of product, the information encryption sub-module 223 may be configured to exclude the product sales from the item information. Accordingly, the encrypted item information generated by the information encryption sub-module 223 does not include the excluded item information.

Furthermore, the data encryption operation executed by the information encryption sub-module 223 may also be used to generate the encrypted item information by, for example, converting the item information into mapping item information. In an exemplary embodiment of the disclosure, the information encryption sub-module 223 may encrypt the item information to generate the encrypted item information. For example, the at least one processor 110 may be configured to run the information encryption sub-module 223 so as to encrypt the item information using an encryption algorithm such as Advanced Encryption Standard (AES), Data Encryption Standard (DES), Triple Data Encryption Algorithm (3DES), RC2 encryption algorithm, RSA encryption algorithm, etc. Nonetheless, in another exemplary embodiment of the disclosure, the information encryption sub-module 223 may also be configured to convert the item information into the mapping item information using a normalization process. Accordingly, the encrypted item information generated by the information encryption sub-module 223 may include the mapping item information. For example, the information encryption sub-module 223 may be configured to rename the product name of one specific product so as to covert it into a mapping product name. Alternatively, the at least one processor 110 may be configured to obtain a mapping product price by calculating an average value of multiple product prices provided by multiple server tenants 20 for the same product, and record a correlation between the item information and the mapping item information to the database 240 of the at least one memory 120. In this way, the information encryption sub-module 223 may be configured to execute a restore mapping operation on the encrypted service data model provided by the service developer 30 according to the recorded correlation in the database 240, so as to obtain the service data model including the real data.

Referring back to FIG. 2, the dispatching module 230 may be configured to execute a dispatching operation for dispatching the at least one online service request of the service tenant 20 to the at least one application service unit 211(1) to 211(X) and the at least one application service evaluation unit 212(1) to 212(N). In detail, the at least one processor 110 may be configured to run the dispatching module 230 for assigning the at least one online service request to be dispatched to the at least one application service unit 211(1) to 211(X) and the at least one application service evaluation unit 212(1) to 212(N) according to a preset traffic rate. In the present exemplary embodiment, for maintaining the quality of service, the at least one processor 110 may be configured to dispatch most traffic of the at least one online service request to the at least one application service unit 211(1) to 211(X). Moreover, in the present embodiment, the at least one server 130(1) to 130(S) of the online cloud-based service processing system 10 (e.g., the cloud-based service server 210) may further include at least one host (e.g., a physical host or a virtual host), and the dispatching module 230 may be deployed in one or more hosts.

In the present exemplary embodiment, the at least one processor 110 may also be configured to record traffic information of the at least one online service request to the database 240 of the at least one memory 120. The traffic information may be, for example, a service tenant account for sending the at least one online service request, an emergence time of the online service request, a clicked web page, an order, etc., or information related to the online service request and the application service unit (e.g., traffic) is provided after the at least one processor 110 is configured to execute the dispatching operation. In addition, the at least one processor 110 may also be configured to record whether the online service request is dispatched to the at least one application service unit 211(1) to 211(X) or the at least one application service evaluation unit 212(1) to 212(N), to the database 240.

Figure 4:
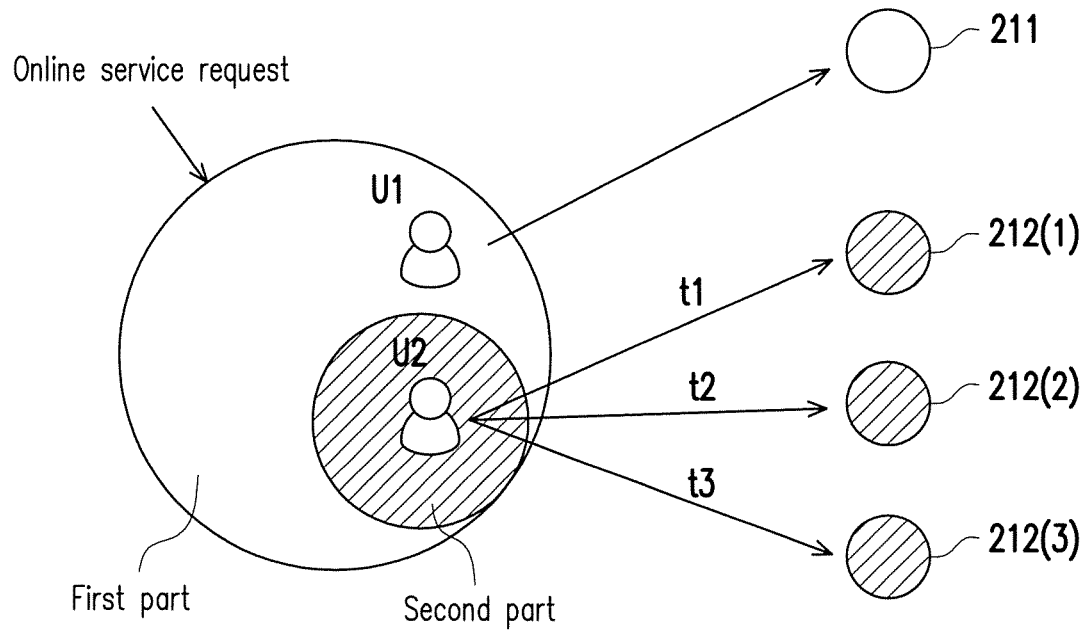
FIG. 4 is a schematic diagram illustrating dispatching of the online service request according to an exemplary embodiment.

FIG. 4 is a schematic diagram illustrating dispatching of the online service request according to an exemplary embodiment.

Referring to FIG. 2 and FIG. 4 together, in the present exemplary embodiment, the at least one processor 110 included by the at least one server 130(1) to 130(S) of the online cloud-based service processing system 10 may be configured to run an application service unit 211 and application service evaluation units 212(1) to 212(3) for executing the cloud-based service function. The at least one processor 110 may be configured to run the dispatching module 230 for dividing the at least one online service request into the online service request to be dispatched to the application service unit 211 (hereinafter, also known as a first part) and the online service request to be dispatched to the application service evaluation units 212(1) to 212(3) (hereinafter, also known as a second part). For example, the dispatching module 230 divides the online service request sent by a user U1 as the first part to be dispatched to the application service unit 211. The dispatching module 230 divides the online service requests sent by a user U2 in three time periods t1 to t3 as the second part to be dispatched to the application service evaluation units 212(1) to 212(3), respectively. In the present exemplary embodiment, the dispatching module 230 may be configured to dispatch the online service request sent by the user U2 during the time period t1 to the application service evaluation unit 212(1); dispatch the online service request sent by the user U2 during the time period t2 to the application service evaluation unit 212(2); dispatch the online service request sent by the user U2 during the time period t3 to the application service evaluation unit 212(3). The dispatching function as described above will be explained below with reference to the exemplary embodiment of FIG. 5.

Figure 5:
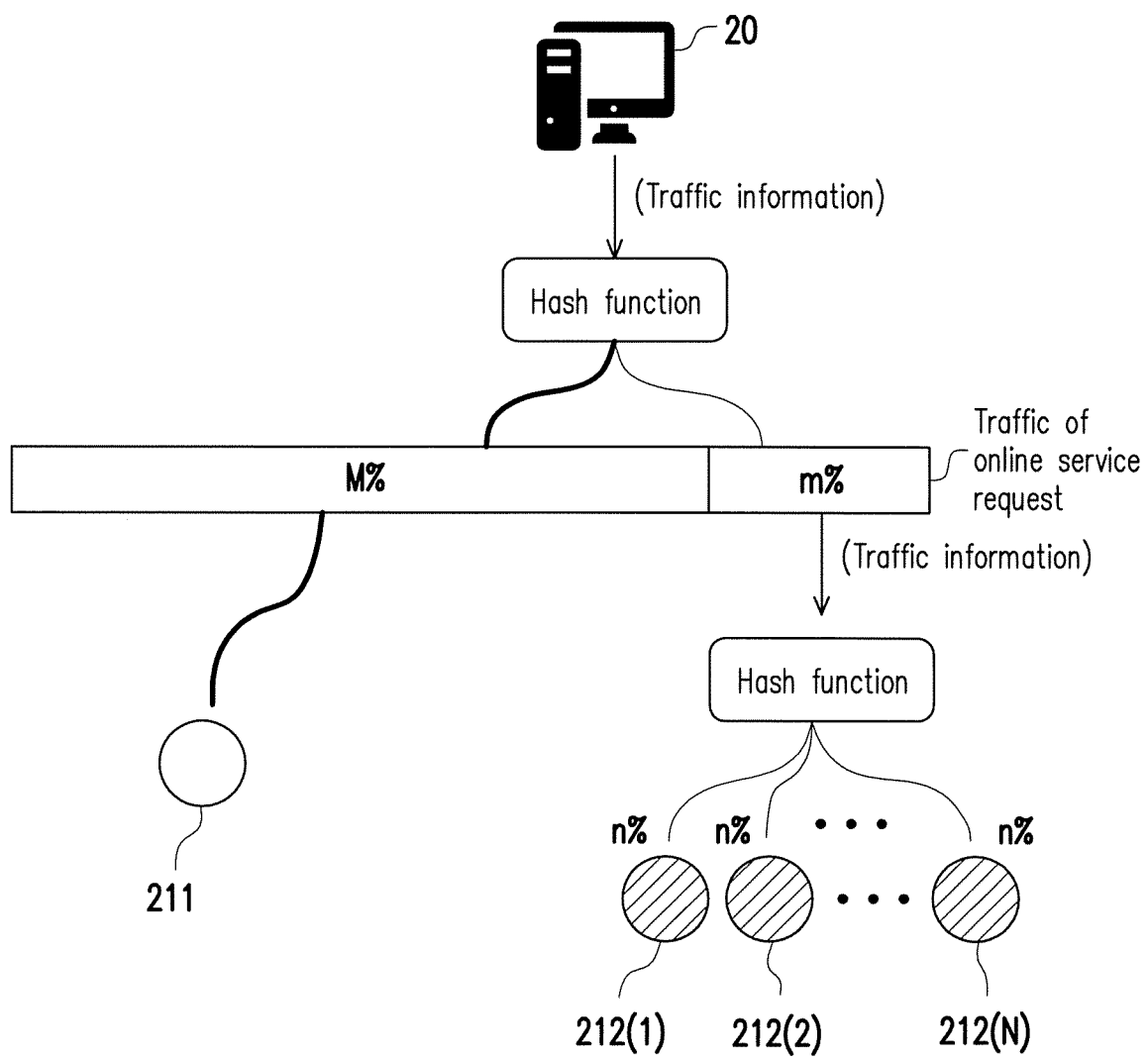
FIG. 5 is a schematic diagram illustrating dispatching of the online service request based on a traffic rate according to an exemplary embodiment.

FIG. 5 is a schematic diagram illustrating dispatching of the online service request based on a traffic rate according to an exemplary embodiment.

Referring to FIG. 2 and FIG. 5, in the present exemplary embodiment, the at least one processor 110 included by the at least one server 130(1) to 130(S) (e.g., the cloud-based service server 210) of the online cloud-based service processing system 10 may be configured to run one application service unit 211 and N application service evaluation units 212(1) to 212(N) for executing the cloud-based service function. The service tenant 20 provides multiple online service requests to the online cloud-based service processing system 10 according to user's operation. The at least one processor 110 may preset a main traffic rate M % corresponding to the application service unit 211 and an evaluation traffic rate m % (hereinafter, also known as a total evaluation traffic rate) corresponding to the application service evaluation units 212(1) to 212(N). In the present exemplary embodiment, the at least one processor 110 may be configured to set the main traffic rate M % to be greater than the total evaluation traffic rate m %, where a sum of M and m is equal to 100. For instance, in an embodiment, the main traffic rate is set to 80%, and the total evaluation traffic rate is set to 20%. In other words, the dispatching module 230 may be configured to divide the online service request with 80% traffic as the first part to be dispatched to the application service unit 211 and divide the online service request with 20% traffic as the second part to be dispatched to the application service evaluation units 212(1) to 212(N).

In the present exemplary embodiment, N application service evaluation unit 212(1) to 212(N) are registered on the online cloud-based service processing system 10. Therefore, the dispatching module 230 may also be configured to assign the second part of the online service requests evenly to each of the application service evaluation units. In other words, the dispatching module 230 may be configured to set an individual evaluation traffic rate as n % for each application service evaluation unit, and the total evaluation traffic rate m % is equal to the individual evaluation traffic rate n % multiplied by N (i.e., the number of the application service evaluation units). For instance, if the total evaluation traffic rate is 20% and ten application service evaluation units are registered on the online cloud-based service processing system 10, the at least one processor 110 may be configured to set the individual evaluation traffic rate as 2% for each application service evaluation unit. In other words, the at least one processor 110 may be configured to dispatch the online service request with 2% traffic to each application service evaluation unit.

In an implementation, the at least one processor 110 may calculate one value (hereinafter, also known as a first assigning value) for each online service request, and determine how to dispatch each online service request according to the calculated value. In the present exemplary embodiment, the at least one processor 110 calculates a hash value by inputting the traffic information of each online service request to a hash function, and generates the first assigning value according to the hash value. Herein, the traffic information to be inputted to the hash function may be determined based on actual requirements, and content of the traffic information is not particularly limited by the disclosure. Taking the product smart recommendation service in an E-commerce shopping website (i.e., the service tenant) as an example, to ensure that customers may receive the same evaluation application service during a browsing period, the traffic information to be inputted to the hash function could include a service tenant name, a browsing period number and an emergence period. If the at least one processor 110 calculates the first assigning value according to one specific online service request and determines that the first assigning value corresponds to the main traffic rate, the at least one processor 110 may be configured to determine that this specific online service request belongs to the first part which is then dispatched to the application service unit 211. In addition, the at least one processor 110 may also be configured to perform the normalization process on the calculated hash value to generate the first assigning value. For example, in the present exemplary embodiment, if the first assigning value generated through the normalization process is between 0 and M, the at least one processor 110 may be configured to dispatch the online service request to the application service unit 211. On the other hand, if the first assigning value generated through the normalization process is between M and 100, the at least one processor 110 may be configured to dispatch the online service request to the application service evaluation units 212(1) to 212(N). A range between 0 and M may be defined as a range in which values are greater than or equal to 0 and less than M, and a range between M and 100 may be defined as a range in which values are greater than or equal to M and less than 100. The at least one processor 110 may be configured to pre-record a correspondence relation of the first assigning value with respect to the at least one application service unit (or the main traffic rate) and at least one application service evaluation unit (or the total evaluation traffic rate) to the database 240 of the at least one memory 120.

Similarly, if the at least one processor 110 is configured to determine that the first assigning value corresponds to the total evaluation traffic rate (e.g., between M and 100), the at least one processor 110 may be configured to determine that the online service request belongs to the second part and dispatch the online service request to the application service evaluation units 212(1) to 212(N). In the present exemplary embodiment, the at least one processor 110 may also be configured to further calculate another value (hereinafter, also known as a second assigning value) for the online service request. For example, the at least one processor 110 may be configured to calculate a hash value by inputting the traffic information (e.g., the service tenant name, the browsing period number and the emergence period) of the online service request to a hash function, and generate the second assigning value according to the hash value. Further, the at least one processor 110 may also be configured to perform the normalization process on the calculated hash value to generate the second assigning value. As similar to the method of determining the first assigning value, in the present exemplary embodiment, if the second assigning value generated through the normalization process is between 0 and n, the at least one processor 110 may be configured to dispatch the online service request to the application service evaluation unit 212(1). If the second assigning value generated through the normalization process is between n and 2n, the at least one processor 110 may be configured to dispatch the online service request to the application service evaluation unit 212(2). By analogy, the traffics of the online service request dispatched to the application service evaluation units 212(1) to 212(N) may match the preset total evaluation traffic rate, and the traffics dispatched to the application service evaluation units may tend to be equal to one another. Aforesaid hash functions for generating the first assigning value and the second assigning value may be identical or different. In addition, the first assigning value and the second assigning value may also be generated based on random numbers. However, the disclosure is not limited to the above, the first assigning value and the second assigning value may also be generated by using other methods.

Referring back to FIG. 2, the evaluation module 250 may be configured to execute an evaluation operation for calculating at least one ranking for each of the at least one application service evaluation unit 212 based on output result(s) generated by the at least one application service evaluation unit 212.

Figure 6:
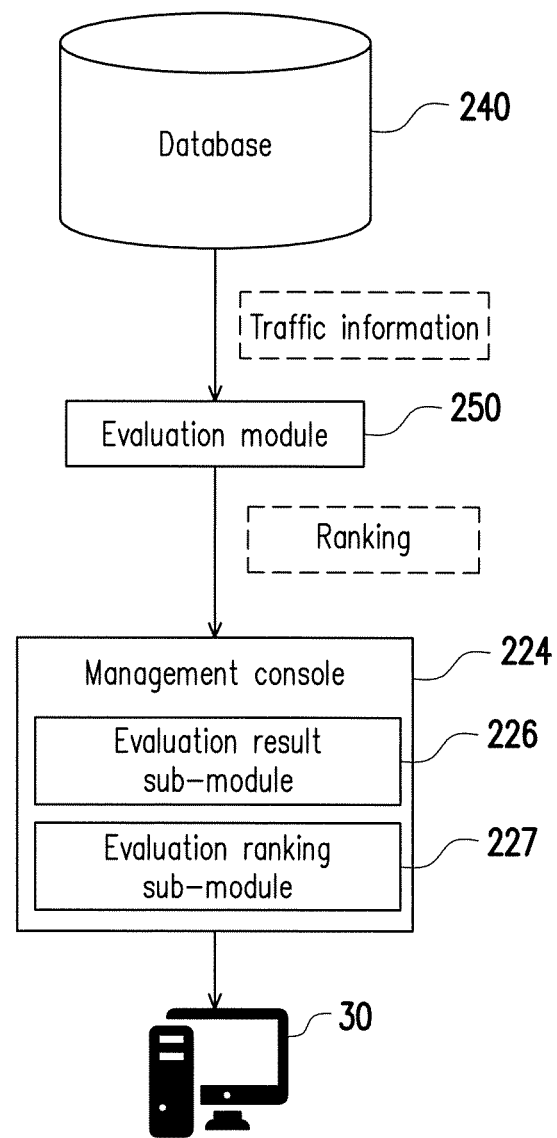
FIG. 6 is a schematic diagram illustrating a performance evaluation operation according to an exemplary embodiment.

FIG. 6 is a schematic diagram illustrating a performance evaluation operation according to an exemplary embodiment.

Referring to FIG. 2 and FIG. 6, the at least one processor 110 may be configured to run the evaluation module 250 for calculating at least one evaluation index corresponding to the at least one application service evaluation unit 212(1) to 212(N), so as to obtain the at least one ranking for the at least one application service evaluation unit 212(1) to 212(N) according to the calculated at least one evaluation index. In an embodiment, each application service evaluation unit itself may include the at least one evaluation index and obtain at least one ranking. In detail, the at least one processor 110 may be configured to store the output result(s), generated by the at least one application service evaluation unit 212(1) to 212(N) according to the at least one online service request, to the database 240. In addition, the at least one processor 110 may be configured to pre-determine how to calculate the at least one evaluation index required for calculating the ranking, and run the evaluation module 250 for calculating the at least one evaluation index according to the traffic information and the output result(s) stored in the database 240. Taking the product recommendation service of the shopping website as an example, the evaluation index may be, a click-through rate, an order rate, a click-order rate, a resource usage, etc. The traffic information stored in the database 240 may include a browsing history of each shopping website and a correspondence relation between the at least one online service request and the application service evaluation units 212(1) to 212(N). For example, the click-through rate may be calculated based on the number of times the output result(s) of the at least one application service evaluation unit 212(1) to 212(N) is clicked by the user(s), as recorded in the database 240; the order rate may be calculated based on the number of orders being placed, as recorded in the database 240; and the click-order rate may be calculated based on the number of times the output result(s) of the at least one application service evaluation unit 212(1) to 212(N) is clicked by the user(s) for generating the order, as recorded in the database 240.

The evaluation module 250 may be configured to calculate the at least one evaluation index corresponding to the at least one application service evaluation unit 212(1) to 212(N) according to the traffic information and the at least one output result of the at least one application service evaluation unit 212(1) to 212(N). In an embodiment, each application service evaluation unit itself may have the at least one evaluation index. For example, the evaluation module 250 may directly calculate the ranking for the at least one application service evaluation unit 212(1) to 212(N) using one single evaluation index. In addition to that, the evaluation module 250 may also calculate the ranking according to multiple evaluation indexes and corresponding weight values. For instance, the at least one processor 110 may be configured to calculate the ranking according to "click-through rate" and "order rate". Assuming that the main purpose of the ranking is to find the application service evaluation unit of the cloud-based service with the highest click-through rate, the at least one processor 110 may be configured to set a maximum weight value corresponding to the evaluation index "click-through rate", and obtain the ranking by summing "click-through rate" and "order rate" each multiplied by the respective corresponding weight value. The weight value corresponding to each evaluation index is not particularly limited by the disclosure.

Referring back to FIG. 2, the management console 224 includes an evaluation description sub-module 225, an evaluation result sub-module 226 and an evaluation ranking sub-module 227.

The evaluation description sub-module 225 may be configured to provide description related to the at least one application service evaluation unit 212(1) to 212(N) (e.g., an introduction to the application), or provide evaluation information (e.g., a cloud-based service description, an evaluation rule, a performance evaluation index and a calculating method), required data format (e.g., a fixed format of the service data model result file), etc., as provided by the online cloud-based service processing system 10.

The evaluation result sub-module 226 may be configured to provide an evaluation result to the service developer 30 according to the ranking. In an exemplary embodiment, the evaluation result sub-module 226 may execute a statistics test such as a T testing or an analysis of variance (ANOVA) according to the ranking for each application service evaluation unit, so as to generate the evaluation result by comparing the rankings of the application service evaluation units. In another exemplary embodiment, the evaluation result sub-module 226 may generate the evaluation result by directly comparing the rankings of the application service evaluation units.

The evaluation ranking sub-module 227 is configured to generate a ranking leader board according to the rankings of the application service evaluation units or the evaluation result.

In the present exemplary embodiment, the at least one processor 110 may also be configured to run the registration sub-module 221 of the evaluation management module 220 for registering at least one comparison application service unit according to the at least one application service unit 211(1) to 211(X). In detail, the at least one processor 110 may be configured to copy the at least one application service unit 211(1) to 211(X) to generate the at least one comparison application service unit, and use the at least one comparison application service unit as at least one of the at least one application service evaluation unit 212(1) to 212(N). In other words, among the at least one online service request dispatched to the at least one application service evaluation unit 212(1) to 212(N), a part of the online service request may be configured to be dispatched to the at least one comparison application service unit. Accordingly, the at least one comparison application service unit and the at least one application service evaluation unit 212(1) to 212(N) may separately execute the cloud-based service for the online service request of the same traffic rate. The at least one processor 110 may be configured to calculate the corresponding ranking based on the evaluation index of the at least one comparison application service unit, and may compare the ranking of the at least one comparison application service unit (i.e., the copied at least one application service unit 211) with the ranking, e.g., good or bad performance, or other rankings, of the at least one application service evaluation unit 212(1) to 212(N).

In the present exemplary embodiment, aforementioned each module is implemented in a software form and stored in the at least one memory 120. During operation of the online cloud-based service processing system 10, the at least one processor 110 included by the at least one server 130(1) to 130(S) may be configured to load the program codes of each module from the at least one memory 120 in order to execute the corresponding operation. Nevertheless, it could be understood that the disclosure is not limited thereto. In another exemplary embodiment, the corresponding function of each module may also be implemented in form of hardware circuit.

Figure 7:
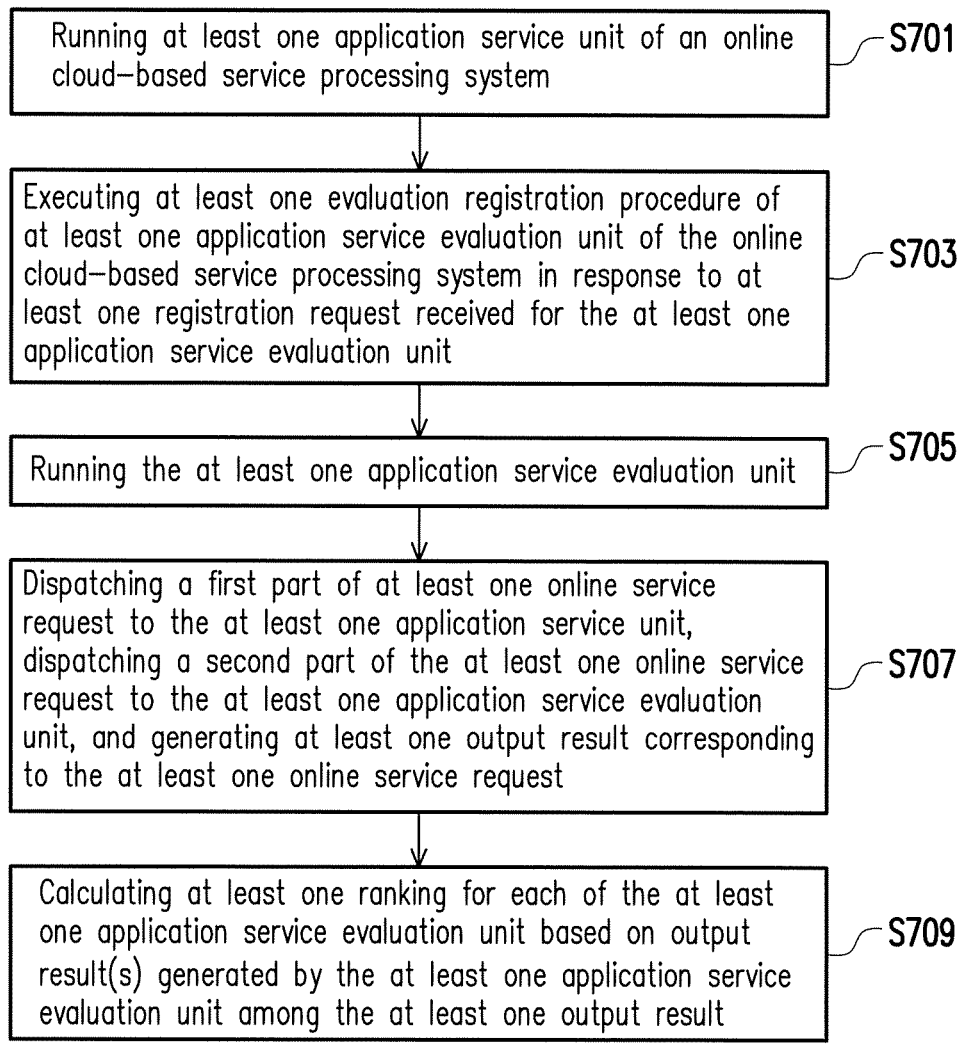
FIG. 7 is a flowchart illustrating an online evaluation method according to an exemplary embodiment.

FIG. 7 is a flowchart illustrating an evaluation method according to an exemplary embodiment. The evaluation method is adapted to the online cloud-based service processing system as described above. The online cloud-based service processing system includes at least one memory and at least one processor, and the at least one processor is configured to execute a plurality of codes stored in the at least one memory to perform the online evaluation method Referring to FIG. 7, in step S701, the at least one processor 110 may be configured to run the at least one application service unit 211(1) to 211(X) of the online cloud-based service processing system. Also, in step S703, the at least one processor 110 may be configured to execute at least one evaluation registration procedure of the at least one application service evaluation unit 212(1) to 212(N) of the online cloud-based service processing system in response to at least one registration request received for the at least one application service evaluation unit 212(1) to 212(N). In this step, the at least one processor 110 may be configured to set at least one service logic rule and at least one service data model of the at least one application service evaluation unit 212(1) to 212(N).

Then, in step S705, the at least one processor 110 may be configured to run the at least one application service evaluation unit 212(1) to 212(N).

In step S707, the at least one processor 110 may be configured to dispatch a first part of at least one online service request to the at least one application service unit 211(1) to 211(X), dispatch a second part of the at least one online service request to the at least one application service evaluation unit 212(1) to 212(N), and generate at least one output result corresponding to the at least one online service request. In this step, the at least one processer 110 may be configured to calculate at least one first assigning value corresponding to the at least one online service request, and divide the at least one online service request into the first part and the second part according to the at least one first assigning value. Further, the at least one processor 110 may also be configured to calculate at least one second assigning value corresponding to the second part of the at least one online service request, and dispatch the second part of the at least one online service request to the at least one application service evaluation unit 212(1) to 212(N) according to the at least one second assigning value.

In step S709, the at least one processor 110 may be configured to calculate at least one ranking for each of the at least one application service evaluation unit based on output result(s) of the at least one application service evaluation unit 212(1) to 212(N) among the at least one output result.

Details regarding each step in FIG. 7 have been described in the foregoing embodiments, and thus related descriptions are not repeated hereinafter.

Another exemplary embodiment of the disclosure proposes a computer program product, which is configured to execute each step in aforesaid online evaluation method. The computer program product includes a non-transitory computer readable storage medium having a computer readable program stored therein, wherein the computer readable program, when executed on the online cloud-based service processing system 10 includes the at least one processor 110 included by the at least one server 130(1) to 130(S) of the online cloud-based service processing system 10, is capable of the accomplishing aforesaid online evaluation method and realizing the functions of the online cloud-based service processing system 10.

Based on the aforementioned exemplary embodiments, while running the application service unit to maintain stability of the cloud-based service, the online cloud-based service processing system is also capable of running the application service evaluation unit to connect the application developed by the service developer to an online environment of the service tenant for the online test. Accordingly, an evaluation service participating in the application developed by the application developer may be provided. An online cloud-based service processing system, an online evaluation method and a computer program product thereof, which are capable of providing services continuously while allowing the online test(s) for a cloud-based service is disclosed.

In summary, the cloud-based service server in accordance with the embodiment(s) of the disclosure may run the at least one application service evaluation unit and the at least one application service unit during the same period. With the provided dispatching mechanism, a large part of the online service request may be dispatched to the at least one application service unit for executing general cloud-based service functions, and a small part of the online service request may be provided to the at least one application service evaluation unit for executing testing cloud-based service functions. As a result, while continuously providing the service the online cloud-based service server mainly by the at least one application service unit, the online cloud-based service server may further provide the at least one application service evaluation unit for evaluation testing and ranking according to the online service request in real time.

It will be apparent to those skilled in the art that various modifications and variations may be made to the disclosed embodiments. It is intended that the specification and examples be considered as exemplary only, with a true scope of the present disclosure being indicated by the following claims and their equivalents.

What is claimed is:

1. An online cloud-based service processing system, comprising:
    at least one server, each server comprising at least one memory and at least one processor, and the at least one processor is configured to execute a plurality of codes stored in the at least one memory;
    at least one application service unit, configured to run at least one application service;
    at least one application service evaluation unit, configured to evaluate one or more application services;
    an evaluation management module, configured to execute at least one evaluation registration procedure of the at least one application service evaluation unit in response to at least one registration request received for the at least one application service evaluation unit;
    a dispatching module, configured to dispatch a first part of at least one online service request to the at least one application service unit and dispatch a second part of the at least one online service request to the at least one application service evaluation unit, so as to generate at least one output result corresponding to the at least one online service request; and
    an evaluation module, configured to calculate at least one ranking for each of the at least one application service evaluation unit based on output result(s) generated by the at least one application service evaluation unit among the at least one output result,
    wherein the dispatching module further generates a first assigning value according to traffic information of the at least one online service request of a service tenant, and determines, according to the first assigning value and a preset traffic rate, whether the at least one online service request is to be dispatched to the at least one application service unit for processing or to the at least one application service evaluation unit for processing,
    wherein the evaluation management module further comprises a registration sub-module, configured to set at least one service logic rule and at least one service data model corresponding to the at least one application service evaluation unit according to the at least one registration request, so as to execute the at least one evaluation registration procedure of the at least one application service evaluation unit.

2. The online cloud-based service processing system according to claim 1, wherein the at least one registration request comprises at least one service data model result file corresponding to the at least one service data model.

3. The online cloud-based service processing system according to claim 1, wherein the at least one registration request comprises at least one training program code, wherein the at least one application service evaluation unit is configured to execute the at least one training program code so as to create at least one service data model result file corresponding to the at least one service data model.

4. The online cloud-based service processing system according to claim 1, wherein the at least one registration request comprises at least one uniform resource locator, wherein the at least one uniform resource locator corresponds to at least one application programming interface of the at least one service logic rule.

5. The online cloud-based service processing system according to claim 1, wherein the at least one registration request comprises at least one source code corresponding to the at least one service logic rule.

6. The online cloud-based service processing system according to claim 1, wherein the at least one registration request comprises at least one combination program code, wherein the at least one application service evaluation unit is configured to execute the at least one combination program code so as to generate the at least one service logic rule according to at least one service data model result file used by the at least one application service unit.

7. The online cloud-based service processing system according to claim 1, wherein the evaluation management module is configured to receive a plurality of item information and convert the plurality of item information into a plurality of mapping item information, wherein the at least one service data model is generated according to the plurality of mapping item information.

8. The online cloud-based service processing system according to claim 1, wherein the evaluation management module is configured to execute a verification operation according to the at least one service logic rule and the at least one service data model.

9. The online cloud-base service processing system according to claim 1, wherein the dispatching module is configured to calculate at least one first assigning value corresponding to the at least one online service request and divide the at least one online service request into the first part and the second part according to the at least one first assigning value.

10. The online cloud-based service processing system according to claim 9, wherein the dispatching module is configured to calculate at least one second assigning value corresponding to the second part of the at least one online service request and dispatch the second part of the at least one online service request to the at least one application service evaluation unit according to the at least one second assigning value.

11. The online cloud-base service processing system according to claim 10, wherein the dispatching module is configured to generate the at least one first assigning value and the at least one second assigning value according to at least one hash function.

12. The online cloud-based service processing system according to claim 1, wherein the evaluation module is configured to calculate at least one evaluation index corresponding to the at least one application service evaluation unit based on the output result(s) generated by the at least one application service evaluation unit among the at least one output result and calculate the at least one ranking for each of the at least one application service evaluation unit according to the at least one evaluation index.

13. The online cloud-based service processing system according to claim 1, wherein the evaluation management module is configured to create at least one comparison application service unit according to the at least one application service unit and use the at least one comparison application service unit as at least one of the at least one application service evaluation unit.

14. The online cloud-based service processing system according to claim 1, wherein each server among the at least one server further comprises:
    at least one of the at least one application service unit, the at least one application service evaluation unit, the evaluation management module, the dispatching module and the evaluation module.

15. An online evaluation method adapted to an online cloud-based service processing system, the online evaluation method comprising:
    running at least one application service unit of the online cloud-based service processing system;
    executing at least one evaluation registration procedure of at least one application service evaluation unit of the online cloud-based service processing system in response to at least one registration request received for the at least one application service evaluation unit and setting at least one service logic rule and at least one service data model corresponding to the at least one application service evaluation unit according to the at least one registration request;
    running the at least one application service evaluation unit;
    dispatching a first part of at least one online service request to the at least one application service unit, dispatching a second part of the at least one online service request to the at least one application service evaluation unit, and generating at least one output result corresponding to the at least one online service request, wherein further generating a first assigning value according to traffic information of the at least one online service request of a service tenant, and determining, according to the first assigning value and a preset traffic rate, whether the at least one online service request is to be dispatched to the at least one application service unit for processing or to the at least one application service evaluation unit for processing; and
    calculating at least one ranking for each of the at least one application service evaluation unit based on output result(s) generated by the at least one application service evaluation unit among the at least one output result,
    wherein the online cloud-based service processing system includes at least one memory and at least one processor, and the at least one processor is configured to execute a plurality of codes stored in the at least one memory to perform the online evaluation method.

16. The online evaluation method according to claim 15, wherein the at least one registration request comprises at least one service data model result file corresponding to the at least one service data model.

17. The online evaluation method according to claim 15, wherein the at least one registration request comprises at least one training program code, wherein the at least one training program code is configured to create at least one service data model result file corresponding to the at least one service data model.

18. The online evaluation method according to claim 15, wherein the at least one registration request comprises at least one uniform resource locator, wherein the at least one uniform resource locator corresponds to at least one application programming interface of the at least one service logic rule.

19. The online evaluation method according to claim 15, wherein the at least one registration request comprises at least one source code corresponding to the at least one service logic rule.

20. The online evaluation method according to claim 15, wherein the at least one registration request comprises at least one combination program code, wherein the at least one combination program code is configured to generate the at least one service logic rule according to at least one service data model result file used by the at least one application service unit.

21. The online evaluation method according to claim 15, further comprising:
    receiving a plurality of item information; and
    converting the plurality of item information into a plurality of mapping item information,
    wherein the at least one service data model is generated according to the plurality of mapping item information.

22. The online evaluation method according to claim 15, wherein when executing the at least one evaluation registration procedure in response to the at least one registration request, the method further comprises:
    executing a verification operation according to the at least one service logic rule and the at least one service data model.

23. The online evaluation method according to claim 15, further comprising:
    calculating at least one first assigning value corresponding to the at least one online service request, and dividing the at least one online service request into the first part and the second part according to the at least one first assigning value.

24. The online evaluation method according to claim 23, further comprising:
    calculating at least one second assigning value corresponding to the second part of the at least one online service request, and dispatching the second part of the at least one online service request to the at least one application service evaluation unit according to the at least one second assigning value.

25. The online evaluation method according to claim 24, further comprising:
    generating the at least one first assigning value and the at least one second assigning value according to at least one hash function.

26. The online evaluation method according to claim 15, wherein when calculating the at least one ranking, the method further comprises:
    calculating at least one evaluation index corresponding to the at least one application service evaluation unit based on the output result(s) generated by the at least one application service evaluation unit among the at least one output result; and
    calculating the at least one ranking for each of the at least one application service evaluation unit according to the at least one evaluation index.

27. The online evaluation method according to claim 15, further comprising:
    creating at least one comparison application service unit according to the at least one application service unit, and using the at least one comparison application service unit as at least one of the at least one application service evaluation unit.

28. A non-transitory computer readable storage medium having a computer readable program stored therein, wherein the computer readable program is executed on an online cloud-based service processing system including at least one processor to execute functions comprising:

running at least one application service unit of the online cloud-based service processing system;

executing at least one evaluation registration procedure of at least one application service evaluation unit of the online cloud-based service processing system in response to at least one registration request received for the at least one application service evaluation unit and setting at least one service logic rule and at least one service data model corresponding to the at least one application service evaluation unit according to the at least one registration request;

running the at least one application service evaluation unit;

dispatching a first part of at least one online service request to the at least one application service unit, dispatching a second part of the at least one online service request to the at least one application service evaluation unit, and generating at least one output result corresponding to the at least one online service request, wherein further generating a first assigning value according to traffic information of the at least one online service request of a service tenant, and determining, according to the first assigning value and a preset traffic rate, whether the at least one online service request is to be dispatched to the at least one application service unit for processing or to the at least one application service evaluation unit for processing; and calculating at least one ranking for each of the at least one application service evaluation unit based on output result(s) generated by the at least one application service evaluation unit among the at least one output result, wherein the online cloud-based service processing system includes at least one memory and at least one processor, and the at least one processor is configured to execute a plurality of codes stored in the at least one memory to perform the online evaluation method.

* * * * *